S. UTSUNOMIYA.
EDUCATIONAL DEVICE.
APPLICATION FILED DEC. 3, 1913.

1,132,409.

Patented Mar. 16, 1915.
2 SHEETS—SHEET 1.

Witnesses

Inventor
S. Utsunomiya,
By Victor J. Evans
Attorney

S. UTSUNOMIYA.
EDUCATIONAL DEVICE.
APPLICATION FILED DEC. 3, 1913.

1,132,409.

Patented Mar. 16, 1915.
2 SHEETS—SHEET 2.

Witnesses

Inventor
S. Utsunomiya,
By Victor J. Evans
Attorney

UNITED STATES PATENT OFFICE.

SHIKANOSUKE UTSUNOMIYA, OF VANCOUVER, BRITISH COLUMBIA, CANADA.

EDUCATIONAL DEVICE.

1,132,409.  Specification of Letters Patent.  Patented Mar. 16, 1915.

Application filed December 3, 1913. Serial No. 804,518.

*To all whom it may concern:*

Be it known that I, SHIKANOSUKE UTSUNOMIYA, a subject of the Emperor of Japan, residing at Vancouver, in the Province of British Columbia and Dominion of Canada, have invented new and useful Improvements in Educational Devices, of which the following is a specification.

This invention relates to educational devices, particularly designed for the instruction of geography, the main object of the invention being to provide an educational globe which may be adjusted to different observation angles and rotated freely on its axis for the purpose of bringing the different portions thereof clearly into view.

A further object of the invention is to provide an education globe which is adapted to be pneumatically inflated, and which, with the supporting elements thereof, may be collapsed and packed in close compass for storage or transportation.

The invention consists of the features of construction, combination and arrangement of parts herein fully described and claimed, reference being had to the accompanying drawings in which:—

Figure 1:
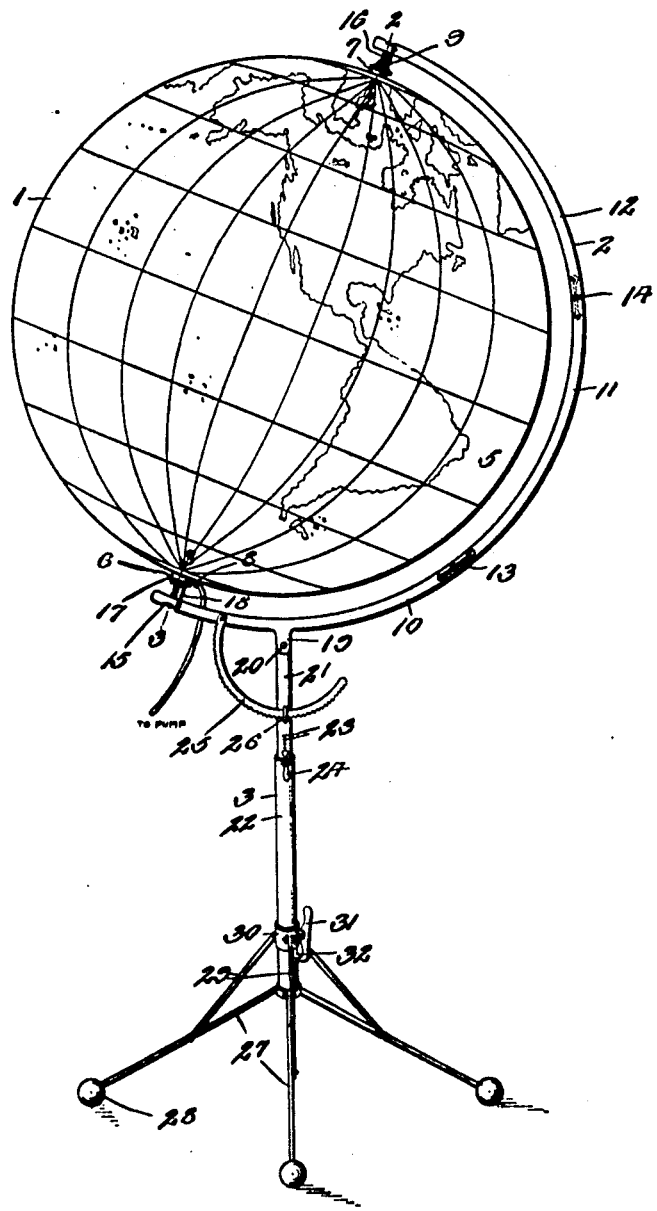
Figure 2:
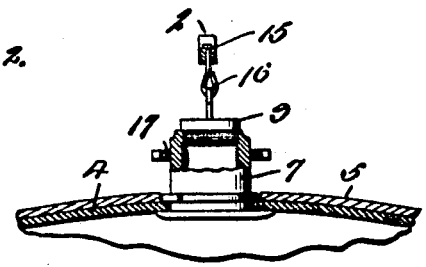
Figure 3:
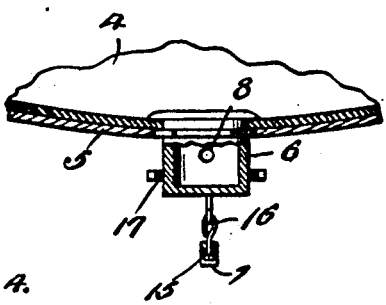
Figure 4:
Figure 5:
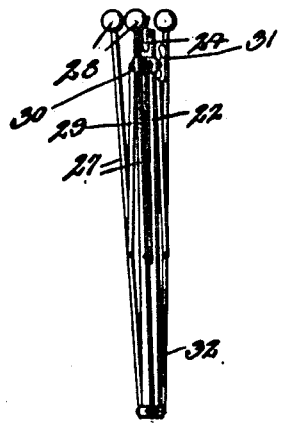

Figure 1 is a perspective view showing the globe mounted for use. Figs. 2 and 3 are enlarged detail sections on the lines 2—2 and 3—3 of Fig. 1. Fig. 4 is a detail view of the folded bracket. Fig. 5 is a similar view of the supporting stand.

In carrying my invention into practice, I provide an educational device comprising generally a globe 1, supporting bracket 2 and supporting stand 3.

The globe 1 comprises an inner inflatable sack 4 of rubber or other suitable elastic material capable of holding air, and an outer protective sack or casing 5 therefor, which may be made of cloth or other suitable material and upon the outer surface of which is painted or otherwise produced an ordinary pictorial representation of the globe. The sacks 4 are capable of expanding fully under a determined air pressure, and of collapsing when relieved of the air pressure to permit them to be rolled or folded in compact form. In line with the poles and axis of the globe filling and discharge tubes or nipples 6 and 7 are provided, which nipples are secured in any substantial manner to both sacks and communicate with the interior of the inner sack. The nipple 6 is provided with a check-valved fitting 8 for connection with an air pump of any suitable type, by which the globe may be inflated, said nipple being otherwise closed, while the nipple 7 is adapted to form a vent passage and is normally closed by a plug 9, upon the removal of which the contained air may be rapidly exhausted from the globe for its collapse.

The globe may be made of any preferred size or capacity of expanding to any given diameter, and preferably the outer sack is provided with a suitable bendable portion (not shown) sewed or otherwise fastened in closed position so as to permit of the ready insertion and removal of the inner sack, in order that the sacks may be conveniently assembled and repairs to the inner sack readily made, the nipples 6 and 7 being so connected with the inner sack as to permit of these operations.

The bracket 2 is of segmental form to surround one-half of the globe, and consists of a series of sections 10, 11 and 12, adapted to be coupled and held rigidly in proper relationship for use by suitable fastening devices 13. As shown, the said sections of the bracket are hingedly connected, as at 14, so that, upon the disengagement of the fastening elements, they may be folded compactly in parallel relation, as illustrated in Fig. 4. The outer ends of the bracket sections 10 and 12 are notched, as at 15, to receive and engage rings or the like on pivot members 16 carried by the nipples 6 and 7, whereby the globe is detachably connected with the rack and is adapted to revolve thereon in the plane of its axis. Each nipple is provided with an annular series of rack teeth 17 adapted to be engaged by a dog 18 consisting of a length of spring wire pivoted to the adjacent end of the bracket. This dog may be folded parallel with the adjacent portion of the bracket to allow the globe to have free revoluble movement, and either or both dogs may be moved into engagement with the coacting rack teeth to limit the speed of rotation of the globe or lock it in fixed or set position for the display of any particular portion of its surface.

The bottom section 10 of the rack is provided with a lug or projection 19 to which is pivoted, as at 20, a rod or tube 21, which is adapted to telescopically engage a tubular standard 22, forming part of the stand 3, teeth or notches 23 being provided on the member 21 to interlock with a dog 24 on the standard, whereby said parts may be held rigidly and yet detachably connected. The bracket and globe are adapted to swing upon the pivot 20 in a forward and rearward direction so that the globe may be adjusted to different angles for more convenient observation as circumstances or occasion may require. The bracket and globe are adapted to be fastened at the desired angle of inclination by a toothed rack segment 25 pivoted to the bracket section 10 and movable through and engageable with a guide loop and locking member 26 on the depending rod or tube 21.

The tubular standard 22 of the supporting stand carries at its lower end a series of pivoted legs 27 having weighted feet 28, which legs are arranged equidistantly around the standard and are adapted to be spread outward to firmly support the device upon a floor, table or other surface. The legs are adapted to be folded inwardly or collapsed, as shown in Fig. 5, and are connected by bracing or stay links 29 with a runner 30 slidable on the standard 22, whereby the braces are adapted to permit inward and outward movements of the legs, the runner 30 carrying a pivoted dog or locking device 31 adapted to engage a fixed shoulder 32 on the standard to lock the legs in outspread condition and prevent accidental collapse thereof.

In setting up the device for use, the parts of the stand and bracket may be extended and assembled in an obvious manner, and the globe then inflated and mounted in position by slipping the engaging rings of the pivot 16 over the notched ends 15 of the bracket. The globe thus mounted for use may be revolved on its axis and adjusted to different angles for convenience in instructing large or small classes in geography. When it is desired to disassemble the device and pack or store the same away in close compass, the globe may be detached from the bracket and deflated and the parts of the bracket and stand folded, as will be readily understood, whereupon all of the elements of the device may be inclosed within a suitable receptacle.

The advantages of the invention will be evident from the foregoing description, and it will be understood that, while the invention is primarily designed for use in instructing students in geography, it may be employed for any other purposes for which the device is adapted.

I claim:—

1. In an educational device, a collapsible pneumatic globe, a support therefor, and members detachably and rotatably connecting the globe with said support, part of said members serving as filling and discharge devices.

2. In an educational device, a stand, a bracket pivotally mounted upon the stand, a collapsible globe provided with inlet and discharge nipples, means connected with the nipples for detachably and rotatably mounting the globe upon the bracket, means for controlling the tilting motion of the bracket upon the stand, and means for locking the globe at any point against rotation.

3. In an educational device, a collapsible, vertically adjustable stand, a foldable bracket pivotally mounted upon the stand, a collapsible globe provided with inlet and discharge nipples, means connected with the nipples for detachably and rotatably mounting the globe upon the bracket, means for controlling the tilting motion of the bracket upon the stand, and means for locking the globe at any point against rotation.

4. In an educational device, a stand, a bracket pivotally mounted upon the stand, a collapsible globe provided with inlet and discharge nipples, means connected with the nipples for detachably and rotatably mounting the globe upon the bracket, and means for controlling the tilting motion of the bracket upon the stand.

5. In an educational device, a collapsible globe, a supporting bracket therefor composed of foldable sections, a foldable stand to which the bracket is pivotally connected for the control adjustment, and means detachably and rotatably mounting the collapsible globe upon the bracket, said means serving as air inlet and discharge devices.

In testimony whereof I affix my signature in presence of two witnesses.

SHIKANOSUKE UTSUNOMIYA.

Witnesses:
J. SHUNSTRUGH,
D. F. WILBER.